United States Patent
Park

(10) Patent No.: US 9,222,278 B2
(45) Date of Patent: Dec. 29, 2015

(54) EXPANDABLE HARD-SHELL TENT MOUNTED ON A ROOF OF VEHICLE

(71) Applicant: SoonGyu Park, Yongin-si (KR)

(72) Inventor: SoonGyu Park, Yongin-si (KR)

( * ) Notice: Subject to any disclaimer, the term of this patent is extended or adjusted under 35 U.S.C. 154(b) by 0 days.

(21) Appl. No.: 14/622,020

(22) Filed: Feb. 13, 2015

(65) Prior Publication Data

US 2015/0292230 A1    Oct. 15, 2015

(30) Foreign Application Priority Data

Apr. 11, 2014    (KR) .................. 10-2014-0043805

(51) Int. Cl.
| | |
|---|---|
| *E04H 15/06* | (2006.01) |
| *E04H 15/00* | (2006.01) |
| *B60P 3/38* | (2006.01) |

(52) U.S. Cl.
CPC . *E04H 15/06* (2013.01); *B60P 3/38* (2013.01); *E04H 15/008* (2013.01)

(58) Field of Classification Search
CPC ......... E04H 15/06; E04H 15/008; B60P 3/38; B60P 3/341
USPC .................... 135/88.13, 88.14, 904
See application file for complete search history.

(56) References Cited

U.S. PATENT DOCUMENTS

| | | | | |
|---|---|---|---|---|
| 2,683,265 | A * | 7/1954 | Wayne ............... | B60P 3/38 135/119 |
| 2,710,977 | A * | 6/1955 | Fannin ............... | B60P 3/38 135/88.17 |
| 2,811,725 | A * | 11/1957 | Cence ................ | B60P 3/38 135/117 |
| 3,009,471 | A * | 11/1961 | Rossiter ............. | B60P 3/38 135/132 |
| 3,351,078 | A * | 11/1967 | Kleiman ............. | B60P 3/38 135/148 |
| 3,375,836 | A * | 4/1968 | Domeneghetti ..... | E04H 15/06 135/116 |
| 3,506,299 | A * | 4/1970 | Arnold ............... | B60P 3/341 296/170 |
| 4,251,102 | A * | 2/1981 | Lee ................... | B60P 3/38 135/88.16 |
| 4,366,979 | A * | 1/1983 | Pillot ................ | B60P 3/38 135/148 |
| 4,548,438 | A * | 10/1985 | Myers ................ | B60P 3/38 135/88.16 |

(Continued)

FOREIGN PATENT DOCUMENTS

| | | |
|---|---|---|
| JP | 08277658 A | 10/1996 |
| KR | 100578742 B1 | 5/2006 |

(Continued)

OTHER PUBLICATIONS

Korean Notice of Allowance for application No. 10-2014-0043805 dated Jul. 1, 2014.

(Continued)

*Primary Examiner* — Noah Chandler Hawk
(74) *Attorney, Agent, or Firm* — Hauptman Ham, LLP

(57) ABSTRACT

An automotive rooftop tent includes a lower case detachably fixed to the roof of a vehicle and an upper case closing or opening the lower case by means of opening/closing mechanisms. The automotive rooftop tent includes: an expandable plate slidably coupled to the lower case; a pole having both ends pivotably coupled to both sides of the rear of the expandable plate; and a tenting fabric connected at least to the upper case, the pole, and the expandable plate, in which the expandable plate slides between a first position, where the expandable plate overlapping the lower case, and a second position, where the expandable plate is fully pulled out, and the pole is positioned adjacent to the expandable plate when the expandable plate is at the first position, and is lifted up by the tenting fabric when the expandable plate is at the second position.

8 Claims, 5 Drawing Sheets

(56) References Cited

U.S. PATENT DOCUMENTS

| | | | | |
|---|---|---|---|---|
| 4,653,800 A | * | 3/1987 | Myers | B60P 3/38 |
| | | | | 135/88.16 |
| 4,657,300 A | * | 4/1987 | Penny | B60P 3/341 |
| | | | | 296/170 |
| 2011/0109120 A1 | * | 5/2011 | Bonerb | E04H 15/06 |
| | | | | 296/164 |

FOREIGN PATENT DOCUMENTS

| | | |
|---|---|---|
| KR | 1020130097136 A | 9/2013 |
| KR | 101318392 B1 | 10/2013 |

OTHER PUBLICATIONS

Disclosure on web-site, http://ikamper.co.kr, Feb. 15, 2014.

* cited by examiner (a)

(b)

(c)

EXPANDABLE HARD-SHELL TENT MOUNTED ON A ROOF OF VEHICLE

CROSS-REFERENCE TO RELATED APPLICATIONS

This application claims the priority of Korean Patent Application No. 10-2014-0043805 filed on Apr. 11, 2014, in the Korean Intellectual Property Office, the disclosure of which is incorporated herein by reference.

BACKGROUND OF THE INVENTION

1. Field of the Invention

The present invention relates to an automotive rooftop tent, and more particularly, to an automotive rooftop tent that can be easily pitched by automatically unfolding and expanding when an expandable plate is pulled.

2. Description of the Related Art

Recently, as economic and life levels are improved and various leisure activities become known through the media, leisure culture has been rapidly popularized and various leisure articles has been developed. With an increase of an interest in camping in the leisure activities, a demand for camping products is increasing.

However, most camping products have been imported from companies in foreign countries where camping has been developed first, so it is difficult to obtain camping products suitable for the domestic environment. In particular, a trailer of automotive camping products is in great demand in foreign countries, but it is not suitable for camping in our country because spaces for parking are insufficient and places for camping are usually areas around mountains. Accordingly, in the domestic automotive camping products, there is a rise in demand for a rooftop tent instead of a trailer.

A rooftop tent is a tent that is mounted on the roof of a vehicle to be used like a movable house. Since the rooftop tent is mounted on the roof of a vehicle, unlike a trailer or a camping car, it does not require a specific parking space is not influenced by the configuration of the ground. Further, it is inexpensive relative to a trailer or a camping car, so it has been increasingly popularized in recent years.

FIG. 6 is a diagram illustrating an automotive rooftop tent of the related art (see Korean Patent No. 0578742, titled "Tent mounted on a roof of vehicle" published on Jun. 17, 2005).

Referring to FIG. 6, according to the automotive rooftop tent 1 of the related art, an upper case 2 is lifted and only the space between the upper case 2 and a lower case 3 is used. The rooftop tent has a problem with usability for family camping, because the number of people who can use the tent is limited due to the narrow internal space.

So, rooftop tents with a large internal space have been developed, but they have not been popularized because they are difficult to pitch and complicated in structure. (see Korean Patent No. 0097136, titled "Tent mounted on a roof of vehicle", published on Sep. 2, 2013, 2014).

SUMMARY OF THE INVENTION

The present invention has been made in an effort to solve the problems with the automotive rooftop tent of the related art described above and an object of the present invention is to provide an automotive rooftop tent that can solve the problem that it is complicated and take long time to pitch automotive rooftop tents of the related art because it can be simply pitched and packed only by opening an upper case and pulling out an expandable plate, and that can secure a wider space when the expandable plate is pulled out.

The objects of the present invention are not limited to those described above and other objects may be made apparent to those skilled in the art from the following description.

According to an aspect of the present invention, there is provided an automotive rooftop tent that includes a lower case detachably fixed to the roof of a vehicle and an upper case closing or opening the lower case by means of opening/closing mechanisms. The automotive rooftop tent includes: an expandable plate slidably coupled to the lower case; a pole having both ends pivotably coupled to both sides of the rear of the expandable plate; and a tenting fabric connected at least to the upper case, the pole, and the expandable plate, in which the expandable plate may slide between a first position, where the expandable plate overlapping the lower case, and a second position, where the expandable plate is fully pulled out, and the pole is positioned adjacent to the expandable plate when the expandable plate is at the first position, and is lifted up by the tenting fabric when the expandable plate is at the second position.

The opening/closing mechanism may include an upper link having one end pivotably coupled to the upper case, a lower link having one end pivotably connected to the lower case and the other end pivotably coupled to the other end of the upper link, and a gas spring having both ends pivotably coupled to the upper link and the lower link, respectively.

The opening/closing mechanism may further include a stay having one end pivotably coupled to the lower case and the other end detachably coupled to the lower link.

The upper case and the lower case may be parallel with each other, after the tent is pitched.

The upper case and the lower case may be hinged to each other.

The pole may be streamlined.

The pole may be retractable and stretchable.

The tent may further include a ladder connecting an end of the expandable plate and the ground to each other, after the tent is pitched.

According to the present invention, it is possible to simply pitch and pack the tent only by opening the upper case and pulling out the expandable plate and a wider space can be secured by the expandable plate pulled out.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Indicating that elements or layers are "on" other elements or layers include both a case in which the corresponding elements are just above other elements and a case in which the corresponding elements are intervened with other layers or elements.

Although first, second, and the like are used in order to describe various components, the components are not limited by the terms. The above terms are used only to discriminate one component from the other component. Therefore, a first component mentioned below may be a second component within the technical spirit of the present invention.

Hereinafter, an automotive rooftop tent according to the present invention is described with reference to the accompanying drawings.

Figure 1:
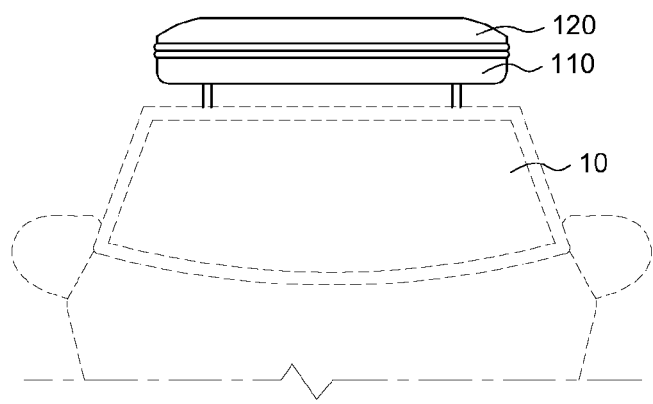
FIG. 1 is a front view illustrating a rooftop tent according to an exemplary embodiment of the present invention which is not pitched yet.
Figure 2:
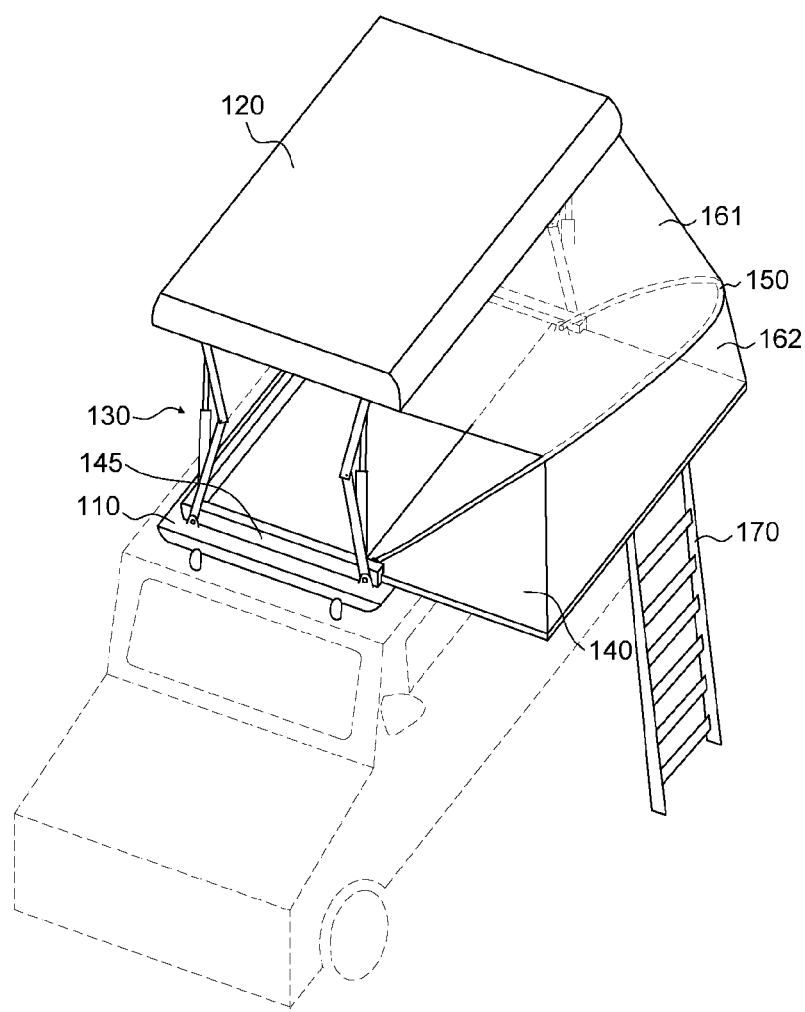
FIG. 2 is a perspective view illustrating the rooftop tent of FIG. 1 which has been pitched.
Figure 3:
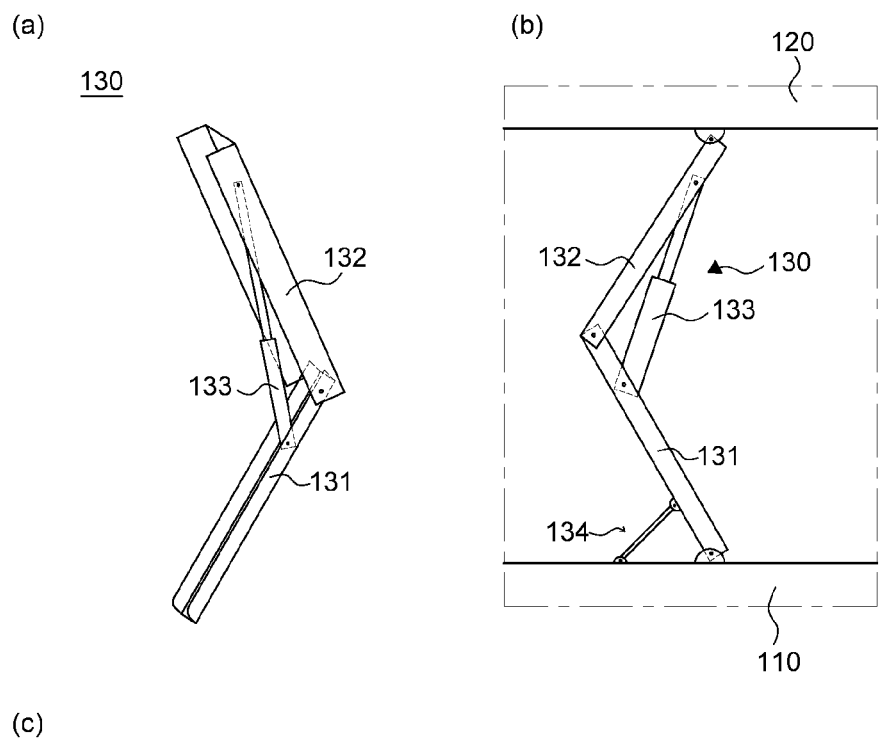
FIG. 3 are a perspective view and front views illustrating an opening/closing mechanism of FIG. 2.
Figure 3:
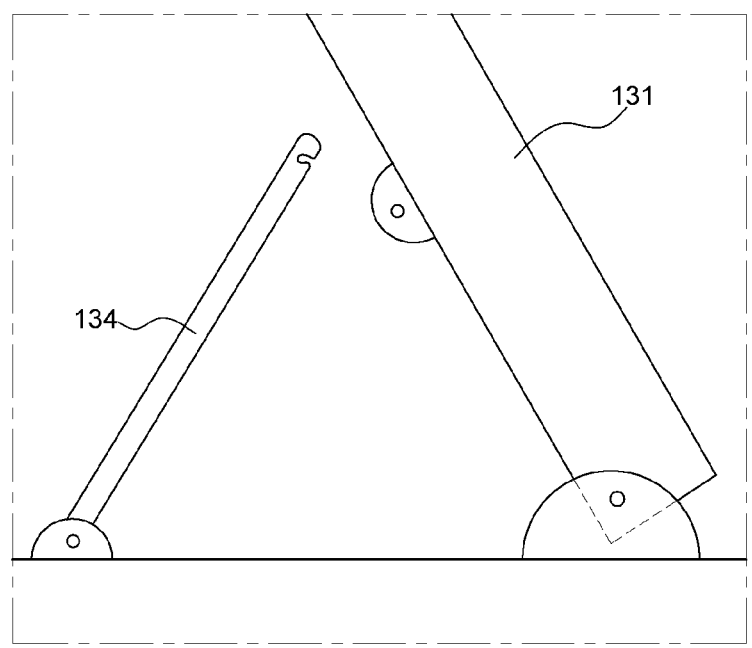

FIG. 1 is a front view illustrating a rooftop tent according to an exemplary embodiment of the present invention which is not pitched yet, FIG. 2 is a perspective view illustrating the rooftop tent of FIG. 1 which has been pitched, and FIG. 3 are a perspective view and a front view illustrating an opening/closing mechanism of FIG. 2.

Referring to FIGS. 1 and 2, an automotive rooftop tent 100 according to an exemplary embodiment of the present invention includes a lower case 110, an upper case 120, opening/closing mechanisms 130, an expandable plate 140, a pole 150, and tenting fabrics 161 and 162.

The lower case 110 may be detachably mounted on the roof of a vehicle 10. The lower case 110 provides a space for stowing the opening/closing mechanisms 130, the expandable plate 140, the pole 150, and the tenting fabrics 161 and 162 before the tent is pitched, and it provides a bottom space when the tent is pitched. Although the top of the lower case 110 is flat in this exemplary embodiment, it may be recessed inward or may be formed in other various shapes. The lower case 110 may be fixed to a roof rack on the roof of the vehicle or fixed directly to the roof of the vehicle and those fixing types may be appropriately selected from the existing fixing types.

The upper case 120 is coupled to the lower case 110 and can be opened/closed by the opening/closing mechanism 130. The upper case 120 provides a space for stowing the opening/closing mechanisms 130, the expandable plate 140, the pole 150, and the tenting fabrics 161 and 162 in cooperation with a cover or the lower case 110 before the tent is pitched, and it functions as a ceiling when the tent is pitched, thereby defining a strong closed internal space. The upper case 120 is strong and not easily damaged, as compared with fabrics used for the ceilings of the existing rooftop tents, so it can more effectively block water and wind. A window that can be opened/closed may be formed in the upper case 120 so that the interior can be seen from the outside.

Although the upper case 120 is larger in width and height than the lower case 110 in order to fully cover the lower case 110, the expandable plate 140, and the tenting fabrics 161 and 162 in this exemplary embodiment, in contrast, the lower case 110 may be larger in width and height, and the widths and heights may be determined in various ways to be capable of completely closing the interior space with the lower case 110 and the upper case 120.

The lower case 110 and the upper case 120 may be positioned in the shape illustrated in FIG. 1 while a vehicle is in motion to minimize air resistance, so the outer portions corresponding to the front of the vehicle 10 may be streamlined, but a specific device for reducing air resistance may be mounted.

The lower case 110 and the upper case 120 may be made of, for example, plastic or metal such as aluminum and it is advantageous to use a soft and light material, considering reduction of fuel efficiency and convenience for use, so plastic is better.

The joints between the lower case 110 and the upper case 120 may be covered with rubber packing when they are closed so that rain cannot permeate inside from the outside, thereby protecting the components inside of the tent. Further, a locking device may be provided to prevent other people from easily opening the tent at the outside. The auxiliary components may be obtained from the related art and are not stated in the following description referring to the drawings.

The opening/closing mechanisms 130 connect the lower case 110 and the upper case 120 such that they can be opened/closed, and they can expand the space between the upper case 120 and the lower case 110 by moving up/down the upper case 120 with respect to the lower case 110. The opening/closing mechanisms 130 may open the upper case 120 with respect to the lower case 110 in various ways, for example, a way that the upper case 120 is opened substantially in parallel with the lower case 110, as in this exemplary embodiment of FIG. 2, and a way that, though described below, the upper case 120 is hinged to the lower case 110 and opened at an angle may be freely used, but the former is advantageous, in respect that it can secure a larger internal space.

Describing the opening/closing mechanisms 130 in detail with reference to (a) to (c) of FIG. 3, the opening/closing mechanisms 130 of this exemplary embodiment each includes a lower link 131, an upper link 132, a gas spring 133, and a stay 134.

The lower link 131 has one end pivotably connected to the lower case 110, the upper link 132 has one end pivotably connected to the upper case 120, and the other ends of the lower link 131 and the upper link 132 are pivotably connected to each other.

The gas spring 133, a mechanism element reducing some of the weight of the upper case 120 that is heavy so that the upper case 120 can be easily lifted up, may be any gas springs being in the market (for example, GSS type by Misumi, Japan). Both ends of the gas spring 133 are pivotably fixed to the middle portions of the lower link 131 and the upper link 132, respectively, as in (a) and (b) of FIG. 3. The positions of the joints of both ends of the gas spring 133 may be appropriately selected in consideration of design factors such as the weight of the upper case 120, repulsion force of the gas spring 133, and the stroke and length of the gas spring 133.

Referring to (c) of FIG. 3, the stay 134 in this exemplary embodiment is rotatably fixed to the lower case 110 is detachably coupled to the lower link 131 by a groove formed to hold a rod, such that it keeps the upper case 120 lifted by the opening/closing mechanism 130, by supporting the lower link 131. The stay 134 is not limited to the type of stay 134 exemplified in this exemplary embodiment and any stays being in the market can be used. Stability of the tent after being pitched can be improved by the stay 134.

There is no need for providing the gas spring 133 and the stay 134 to all of four opening/closing mechanisms 130 and they may be provided selectively to one, two, or three of opening/closing mechanisms.

Referring to (a) to (c) of FIG. 3, the lower link 131 and the upper link 132 of this exemplary embodiment have a U-shaped cross-sectional and are different in size, so the lower link 131, the upper link 132, and the gas spring 133 can be folded, partially overlapping each other, and accordingly, the height after they are folded can be minimized.

For reference, when the lower link 131 and the upper link 132 are folded, they may be arranged inward at an angle or in parallel with the outer side of the lower case 110, and those arrangements may be appropriately selected in designing.

However, the opening/closing mechanisms 130 are not limited to the type using a plurality of links described above. For example, the opening/closing mechanism 130 may be implemented only by a gas spring or may be achieved in the type of opening/closing mechanism disclosed in Korean Patent Application No. 2013-0044316 filed on Apr. 22, 2013 by the applicant(s). The disclosure of Korean Patent Application No. 2013-0044316 is incorporated herein by reference. Further, other types of opening/closing mechanisms that can open/close the tent may be used.

The expandable plate 140 is slidably coupled to the lower case 110 and expands the bottom of the tent when it is pulled out from the lower case 110. For example, the expandable plate 140 may be coupled to the lower case 110 by slide rails and rollers, or a rack-and-pinion type may be available.

Although the top of the expandable plate 140 is coupled to rails 145 on the flat lower case 110, when the lower case 110 is recessed, the expandable plate 140 may be pulled out by disposing the rails 145 on the bottom of the lower case 110 and forming a specific opening at a side of the lower case 110.

The expandable plate 140 needs to be made of a very strong material to resist the weight of people, but the weight needs to be small in order to reduce influence on the fuel efficiency of a vehicle, so it may be made of an aluminum honeycomb or corrugate panel.

The pole 150 has both ends pivotably coupled to both sides of the rear of the expandable plate 140, assuming that the side of the expandable plate 140 that is pulled out is the front. Accordingly, the pole 150 can be turned toward or away from the expandable plate 140.

The pole 150 may be made of the materials of the poles of common tents. The pole 150 may be streamlined, as in FIG. 2, so that it can be stable against an external force, reduce air resistance, and prevent water from collecting on the tenting fabric 161, but it may formed in the shape of a rectangle to secure a wide space and may be formed in other various shapes. Further, the pole 150 may be changed in length to change the size of the area defined by the pole 150 and the expandable plate 140.

The tenting fabrics 161 and 162 are connected at least to the upper case 120, the pole 150, and the expandable plate 140 and function as a side wall of the internal space of the tent and the ceiling of the expanding space. In particular, the upper tenting fabric 161 is connected to the upper case 120 and the pole 150, so it lifts up the pole 150 when the expandable plate 140 is pulled out. For reference, it should be noted that the tenting fabrics for the sidewalls of the space between the upper case 120 and the lower case 110 are not illustrated in FIG. 2 for the convenience of description.

The tenting fabrics 161 and 162 may be made of poly ripstop or poly taffeta and may undergo Teflon processing to be able to protect the internal space from rain and wind, dirt, or external shock. Further, it may be possible to make a window at the tenting fabrics for the sidewalls or the tenting fabric for the ceiling, using urethane.

The tenting fabrics 161 and 162 may be provided as one piece or may be separately formed and the connected by methods known in the art. The configuration of the tenting fabrics is not limited to this exemplary embodiment.

A ladder 170, as in FIG. 2, may be further provided to improve usability and stability of the rooftop tent 100 of this exemplary embodiment. The ladder 170, which is a piece of equipment for users to move up/down to the ground and the interior of the tent, is coupled to an end of the expandable plate 140 and functions as a support, when the expandable plate 140 is pulled out, as in FIG. 2. The ladder 170 may be separately kept and coupled and fixed to the end of the expandable plate 140 after the tent is pitched, or it may be rotatably coupled to the expandable plate 140 and stowed.

Figure 4:
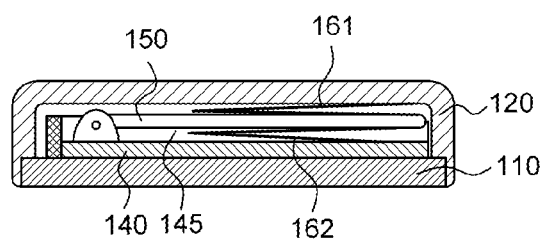
FIG. 4 are front cross-sectional views illustrating processes of pitching the rooftop tent of FIG. 1.
Figure 4:
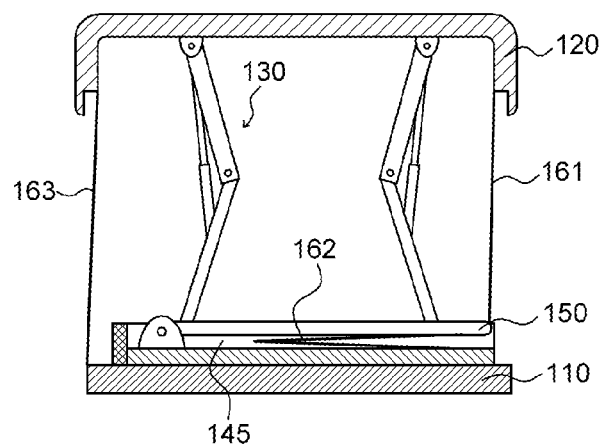
Figure 4:
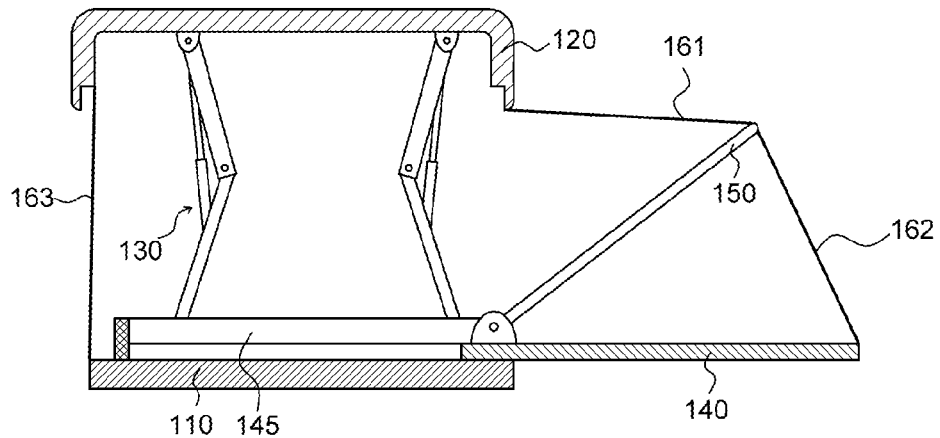

A method of pitching the rooftop tent 100 with the configuration described above, according to an exemplary embodiment of the present invention, is described hereafter in detail with reference to (a) to (c) of FIG. 4.

FIG. 4 are front cross-sectional views illustrating processes of pitching the rooftop tent of FIG. 1.

Referring to (a) of FIG. 4, before the tent is pitched, the upper case 120 and the lower case 110 overlap each other, and the expandable plate 140, the opening/closing mechanisms 130, and the tenting fabrics 161 and 162 are stowed in between the cases. This state may be applied to the case when a vehicle is in motion and the upper case 120 may be locked by a locking device to the lower case 110 to prevent exposure of the components inside the cases while the vehicle runs. The opening/closing mechanisms 130 are not illustrated to avoid complication and make description clear.

In order to set up the tent, as in (b) of FIG. 4, a user lifts up the upper case 120 in person. The upper case 120 can be lifted up even with a small force because of the gas springs 133. When the upper case 120 is fully lifted up, it cannot be moved down by the repulsion force of the gas springs 130, and the opening/closing mechanisms 130 keep fully stretched by the stays 134, so the open position can be kept firmly.

Referring to (a) and (b) of FIG. 4, the expandable plate 140 is positioned over the lower case 110, overlapping the lower case 110 (it is referred to as a 'first position').

Thereafter, the user pulls out the expandable plate 140 away from the lower case 110, from the first position. When the expandable plate 140 is fully pulled out (it is referred to as a 'second position'), as in (c) of FIG. 4, an expanding space is naturally defined over the expandable plate 140.

In detail, in the process of making the expanding space, as the expandable plate 140 slides from the first position to the second position, the upper tenting fabric 161 pulls the pole 150 and the pole 150 is accordingly turned and stood as in (c) of FIG. 4. Accordingly, as the expanding plate 140 is moved from the first position to the second position, the pole 150 is naturally stood and the expanding space is defined.

The pole 150 may be designed to be stretchable upward in order to secure more space upward. In this case, an operation for selectively stretching the pole 150 may be added, after the expandable plate 140 is fully pulled out to the second position.

The tenting fabric 163 for a sidewall may be fixed in advance to the upper case 120 and the lower case 110, as in this exemplary embodiment, or it may not be installed in advance, but installed after the upper case 120 is lifted up.

The tenting fabrics for the sidewalls of the expanding space are connected to the upper case 120 and the expandable plate 140, as one piece with the upper tenting fabric 161 and the lower tenting fabric 162, or they may be separated from the expandable plate 140 before the tent is pitched and then fixed to the expandable plate 140 after the expandable plate 140 is pulled out.

Figure 5:
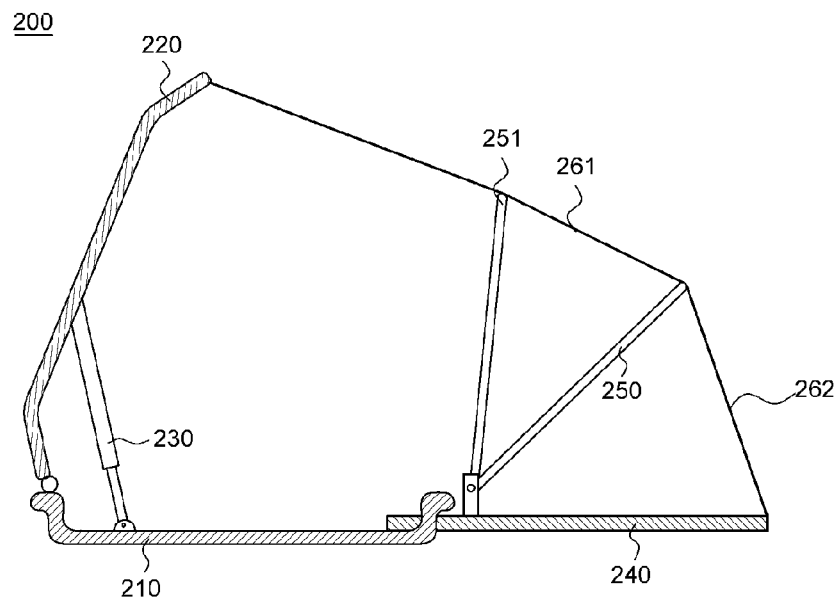
FIG. 5 is a schematic front view illustrating a rooftop tent according to another exemplary embodiment of the present invention.
Figure 6:
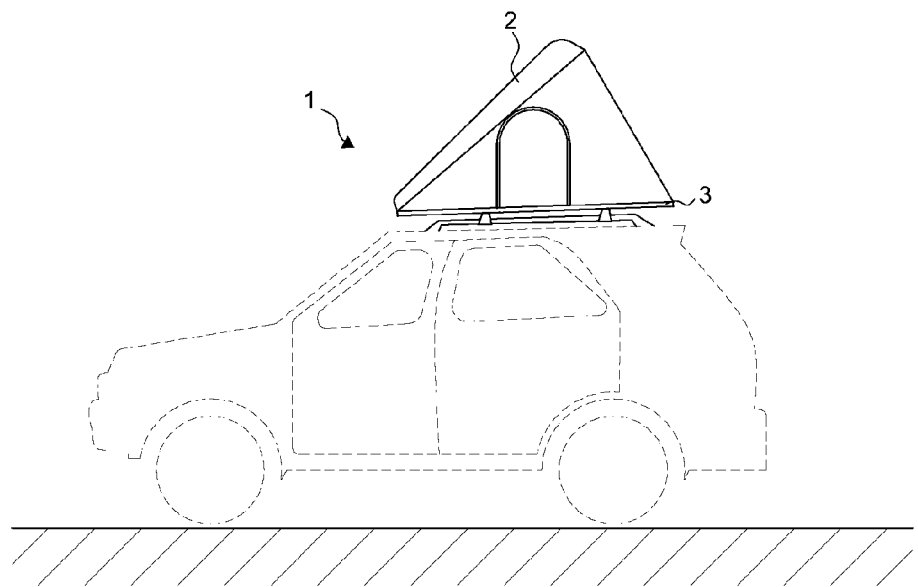
FIG. 6 is a view illustrating an automotive rooftop tent of the related art.

FIG. 5 is a schematic front cross-sectional view of a rooftop tent according to another exemplary embodiment of the present invention.

Referring to FIG. 5, a rooftop tent 200 according to another exemplary embodiment of the present invention includes a lower case 210, an upper case 220, opening/closing mechanisms 230, an expandable plate 240, a pole 250, and tenting fabrics 261 and 262.

The rooftop tent 200 of this exemplary embodiment is the same as the rooftop tent 100 illustrated in FIG. 1, except for the way of opening/closing the upper case 220 and the lower case 210. Hereafter, only the difference is described in detail and the same configuration is not described.

In this exemplary embodiment, the upper case 220 is hinged to the lower case 210 and only gas springs are used for the opening/closing mechanisms. When the upper case 220 and the lower case 210 are hinged to each other for opening/closing, the opening/closing mechanisms 230 are simplified, so it is possible to reduce the spaces for the opening/closing mechanisms 130 illustrated in (b) of FIG. 4 and the upper case 220 can function as a sidewall of the tent. An additional pole 251 may be coupled to the expandable plate 240 to be able to support the upper tenting fabric 261, in order to preventing the upper tenting fabric 261 from sagging.

According to the above description, the automotive rooftop tents 100 and 200 of the present invention can secure a wider space by means of the expandable plate 140 and 240 that are pulled out. Further, it is possible to simply pitch and pack the tents only by opening the upper cases 120 and 220 with respect to the lower cases 110 and 210 and by pulling out the expandable plates 140 and 240. Therefore, it is possible to solve the problem that it is complicated and take long time to pitch the existing rooftop tents.

The exemplary embodiments of the present invention have been described in more detail with reference to the accompanying drawings, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

What is claimed is:

1. An automotive rooftop tent that includes a lower case detachably fixed to the roof of a vehicle and an upper case closing or opening the lower case by means of opening/closing mechanisms, the tent comprising:
   an expandable plate slidably coupled to the lower case;
   a pole having both ends pivotably coupled to both sides of the rear of the expandable plate; and
   a tenting fabric connected at least to the upper case, the pole, and the expandable plate,
   wherein the expandable plate slides between a first position, where the expandable plate overlapping the lower case, and a second position, where the expandable plate is fully pulled out, and
   the pole is positioned adjacent to the expandable plate when the expandable plate is at the first position, and is lifted up by the tenting fabric when the expandable plate is at the second position.

2. The tent of claim 1, wherein the opening/closing mechanism includes an upper link having one end pivotably coupled to the upper case, a lower link having one end pivotably connected to the lower case and the other end pivotably coupled to the other end of the upper link, and a gas spring having both ends pivotably coupled to the upper link and the lower link, respectively.

3. The tent of claim 2, wherein the opening/closing mechanism further includes a stay having one end pivotably coupled to the lower case and the other end detachably coupled to the lower link.

4. The tent of claim 1, wherein the upper case and the lower case are parallel with each other, after the rooftop tent is pitched.

5. The tent of claim 1, wherein the upper case and the lower case are hinged to each other.

6. The tent of claim 1, wherein the pole is streamlined.

7. The tent of claim 1, wherein the pole is retractable and stretchable.

8. The tent of claim 1, further comprising a ladder connecting an end of the expandable plate and the ground to each other, after the rooftop tent is pitched.

* * * * *